(12) United States Patent
Cryan et al.

(10) Patent No.: US 9,995,282 B2
(45) Date of Patent: Jun. 12, 2018

(54) SELECTIVELY PERCEPTIBLE WIND TURBINE SYSTEM

(71) Applicants: The United States of America as represented by the Secretary of the Department of the Interior, Washington, DC (US); Bat Research and Consulting, Tucson, AZ (US); University of Hawaii, Honolulu, HI (US)

(72) Inventors: Paul Michael Cryan, Fort Collins, CO (US); David Charles Dalton, Tucson, AZ (US); Paulo Marcos Gorresen, Keeau, HI (US)

(73) Assignees: The United States of America as Represented by the Secretary of the Department of the Interior, Washington, DC (US); University of Hawaii, Hilo, HI (US); Bat Reseach and Consulting, Tuscon, AZ (US)

( * ) Notice: Subject to any disclaimer, the term of this patent is extended or adjusted under 35 U.S.C. 154(b) by 347 days.

(21) Appl. No.: 14/964,386

(22) Filed: Dec. 9, 2015

(65) Prior Publication Data
US 2016/0169501 A1 Jun. 16, 2016

Related U.S. Application Data

(60) Provisional application No. 62/091,257, filed on Dec. 12, 2014.

(51) Int. Cl.
| F03D 80/10 | (2016.01) |
| A01M 29/10 | (2011.01) |
| F21Y 115/10 | (2016.01) |

(52) U.S. Cl.
CPC ............ *F03D 80/10* (2016.05); *A01M 29/10* (2013.01); *F21Y 2115/10* (2016.08); *Y02E 10/721* (2013.01)

(58) Field of Classification Search
CPC .......... F03D 80/10; F03D 80/00; F03D 17/00; A01M 29/10; A01M 29/08;
(Continued)

(56) References Cited

U.S. PATENT DOCUMENTS

| 6,625,918 B2 | 9/2003 | Bhullar | |
| 8,506,089 B2 * | 8/2013 | Kayser | G03B 21/28 119/713 |

(Continued)

OTHER PUBLICATIONS

Abrisa Technologies, "What is a Dichroic Filter" Oct. 23, 2014, retreived from http://abrisatechnologies.com/wp-content/uploads/2014/10/Dichroic-Filters.pdf.*

*Primary Examiner* — Ninh H Nguyen
*Assistant Examiner* — Topaz L Elliott
(74) *Attorney, Agent, or Firm* — James Mitchell; Elizabeth Neal

(57) ABSTRACT

A selectively perceptible wind turbine system provides illumination in a low intensity and wavelength invisible to the human eye, but visible to certain bats. This illumination deters bats and other flying animals from going near the turbine without becoming a nuisance. At least one ultraviolet (UV) illumination source produces at least one UV beam with a wavelength of approximately 200 nm to approximately 400 nm. This UV beam extends between the UV illumination source and at least one turbine blade surface of a turbine blade. Contact between the UV beam and the turbine blade surface forms an illumination interface with a power density of less than 100 μW/cm².

20 Claims, 3 Drawing Sheets

(58) Field of Classification Search
CPC ... F21Y 2115/10; Y02E 10/721; B64D 45/00; B64D 47/00; B64D 47/06; B64D 2203/00
USPC .............. 416/5; 40/439, 440, 441, 442, 444
See application file for complete search history.

(56) References Cited

U.S. PATENT DOCUMENTS

| | | | | |
|---|---|---|---|---|
| 8,636,388 | B2* | 1/2014 | Roer | F03D 80/10 340/983 |
| 8,816,863 | B2 | 8/2014 | Arman | |
| 9,845,044 | B2* | 12/2017 | Birgen | B60Q 1/326 |
| 2007/0109328 | A1* | 5/2007 | Lewis | G09G 3/3406 345/691 |
| 2009/0165732 | A1* | 7/2009 | Farley | A01K 27/001 119/858 |
| 2010/0110836 | A1 | 5/2010 | Adler et al. | |
| 2010/0236497 | A1* | 9/2010 | Philiben | A01K 11/008 119/712 |
| 2011/0103933 | A1* | 5/2011 | Olesen | G01B 11/16 415/118 |
| 2011/0192212 | A1 | 8/2011 | Delprat et al. | |
| 2012/0136495 | A1 | 5/2012 | Lagrange et al. | |
| 2012/0155058 | A1* | 6/2012 | Pujol Artigas | F03D 80/00 362/35 |
| 2012/0285106 | A1 | 11/2012 | Donoho | |
| 2012/0300589 | A1 | 11/2012 | Adler et al. | |
| 2013/0050400 | A1 | 2/2013 | Stiesdal et al. | |
| 2013/0101417 | A1 | 4/2013 | Cloninger, II et al. | |
| 2013/0224018 | A1 | 8/2013 | Kinzie et al. | |
| 2013/0249218 | A1 | 9/2013 | Vassilev et al. | |
| 2013/0257641 | A1 | 10/2013 | Ronning | |
| 2013/0298845 | A1* | 11/2013 | Blanchard | A01M 29/10 119/713 |
| 2014/0151578 | A1* | 6/2014 | Glavind | G01M 5/0016 250/459.1 |
| 2014/0169968 | A1 | 6/2014 | Hedeen | |
| 2014/0209040 | A1 | 7/2014 | Kinzie et al. | |
| 2014/0261151 | A1 | 9/2014 | Ronning | |
| 2015/0010399 | A1 | 1/2015 | Bahat et al. | |
| 2015/0232304 | A1* | 8/2015 | Monux Belloso | B66C 13/46 414/800 |

* cited by examiner

SELECTIVELY PERCEPTIBLE WIND TURBINE SYSTEM

CROSS-REFERENCE TO RELATED APPLICATIONS

This patent application claims the benefit of U.S. Provisional Application No. 62/091,257 filed Dec. 12, 2014. The above application is incorporated by reference herein.

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

BACKGROUND OF THE INVENTION

1. Field of Invention

This invention relates to the field of wind turbines and more specifically to a system for illuminating wind turbines with selectively perceptible light.

2. Description of Related Art

Wind turbines in the United States kill hundreds of thousands of bats every year, an estimate far exceeding known fatalities from other human causes. Bats are important components of most ecosystems. In addition, insect eating bats save United States farmers billions of dollars each year in pest control. Bat populations are slow to recover from declines and the multiple populations adversely affected by wind turbines include endangered species such as the Hawaiian hoary bat and Indiana bat.

Concerns about the impact of turbines on bats have curtailed wind energy projects. For example, some wind turbine facility operators in the continental United States and Hawaii were required to reduce operations after their turbines killed endangered bats.

Researchers have attempted to use several methods to reduce bat fatalities, with limited success. One method restricts the operation of turbines at low wind speeds. However, this is unpredictable and results in loss of revenue and turbine efficiency without completely eliminating bat fatalities. Sound-producing devices intended to scare bats away have not proven effective. Moreover, these devices are unlikely to work at long distances because of physical limitations of sound transmission through air.

The untested method of shining bright light onto bats to produce an avoidance response would not work in the absence of precise animal targeting and identification or continuous light emission. Bright lights and loud sounds also affect habitats around the turbines and could be a nuisance. Devices that alter the operation of a turbine or activate a deterrent after detecting animals are expensive and do not effectively discriminate between animals. Some devices that effectively deter bats may cause harm to other animals, such as protected migrating birds.

There is an unmet need in the art for a practical, visually unobtrusive, and passive way to prevent bats from approaching and fatally colliding with wind turbines.

BRIEF SUMMARY OF THE INVENTION

The present invention is a selectively perceptible wind turbine system. At least one ultraviolet (UV) illumination source produces at least one UV beam with a wavelength of approximately 200 nm to approximately 400 nm. This UV beam extends between the UV illumination source and at least one turbine blade surface of a turbine blade. Contact between UV beam and the turbine blade surface forms an illumination interface with a power density of less than 100 $\mu W/cm^2$.

BRIEF DESCRIPTION OF SEVERAL VIEWS OF THE DRAWING(S)

TERMS OF ART

As used herein, the term "heat sink" means a heat exchanger that transfers heat generated by a device into a coolant fluid such as, but not limited to, air or water.

As used herein, the term "illumination source" means a device capable of providing illuminating light.

As used herein, the term "passband" means a wavelength or range of wavelengths allowed to pass through a filter.

As used herein, the term "selectively perceptible" means a device or system illuminated by a wavelength or range of wavelengths not universally perceptible.

As used herein, the term "ultraviolet" means electromagnetic radiation with a wavelength from approximately 400 nm to approximately 10 nm.

DETAILED DESCRIPTION OF THE INVENTION

Figure 1:
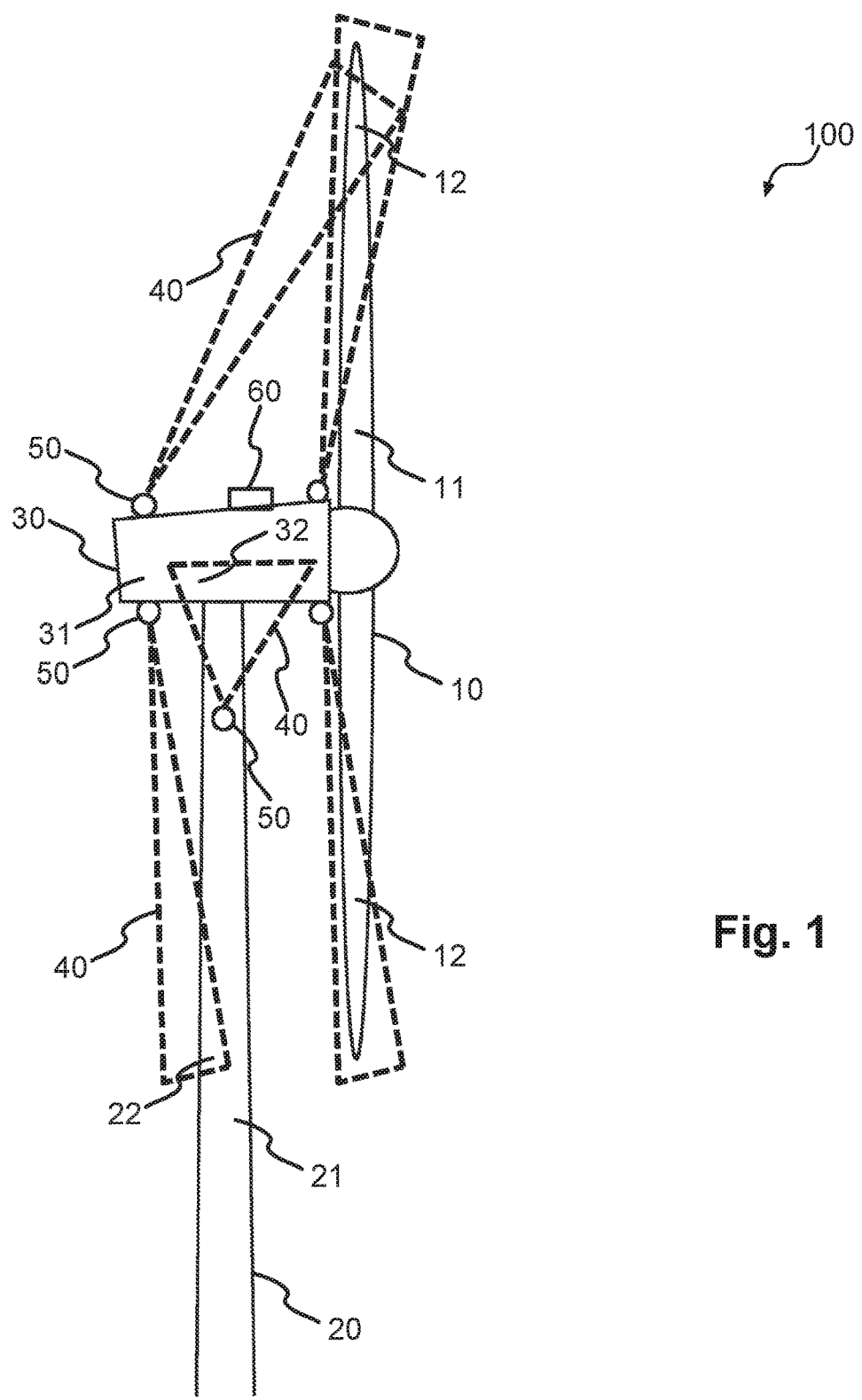
FIG. 1 illustrates a side view of an exemplary embodiment of a selectively perceptible wind turbine system.

FIG. 1 illustrates a side view of an exemplary embodiment of selectively perceptible wind turbine system 100. Wind turbine system 100 includes at least one turbine blade 10, optional turbine monopole 20, optional turbine nacelle 30, at least one UV beam 40 and at least one UV illumination source 50.

Turbine blade 10 includes at least one turbine blade surface 11. UV beam 40 extends between UV illumination source 50 and turbine blade surface 11 to contact turbine blade surface 11. This contact forms an illumination interface 12. Illumination interface 12 has a power density of less than 100 $\mu W/cm^2$. This power density provides dim illumination of turbine blade 10, sufficient to increase visibility to animals capable of perceiving dim UV light, but does not require large amounts of energy and does not result in fluorescence of white-colored surfaces. In the exemplary embodiment, illumination interface 12 has a power density of approximately 1.0 $\mu W/cm^2$.

In the exemplary embodiment, turbine monopole 20 includes at least one turbine monopole surface 21. In certain embodiments, another UV beam 40 extends between UV illumination source 50 and turbine monopole surface 21 to contact turbine monopole surface 21. This contact forms a monopole illumination interface 22. Monopole illumination interface 22 has a power density of less than 100 $\mu W/cm^2$.

Embodiments of wind turbine system 100 that do not use a monopole may instead substitute another support structure for turbine monopole 20. By way of non-limiting example, an embodiment that uses a scaffolding structure for support of wind turbine system 100 may have a turbine scaffold surface. A scaffold illumination interface would also have a power density of less than 100 µW/cm².

In the exemplary embodiment, turbine nacelle 30 includes at least one turbine nacelle surface 31. In certain embodiments, another UV beam 40 extends between UV illumination source 50 and turbine nacelle surface 31 to contact turbine nacelle surface 31. This contact forms a nacelle illumination interface 32. Nacelle illumination interface 32 has a power density of less than 100 µW/cm².

UV illumination source 50 produces UV beam 40. UV beam 40 has a wavelength of approximately 200 nm to approximately 400 nm. In the exemplary embodiment, the UV beam 40 has a wavelength of approximately 365 nm. This wavelength is normally invisible to the human eye, but visible to some animals, such as certain bats and birds. At illumination intensities less than approximately 100 µW/cm² this wavelength is likely visible only to certain bats.

Certain embodiments of wind turbine system 100 utilize a plurality of UV illumination sources 50. In these embodiments, at least two UV illumination sources 50 produce UV beams 40 directed to different sections of wind turbine system 100. This allows selective illumination of different locations of wind turbine system 100, or even illumination of substantially the entire structure of wind turbine system 100.

Figure 2A:
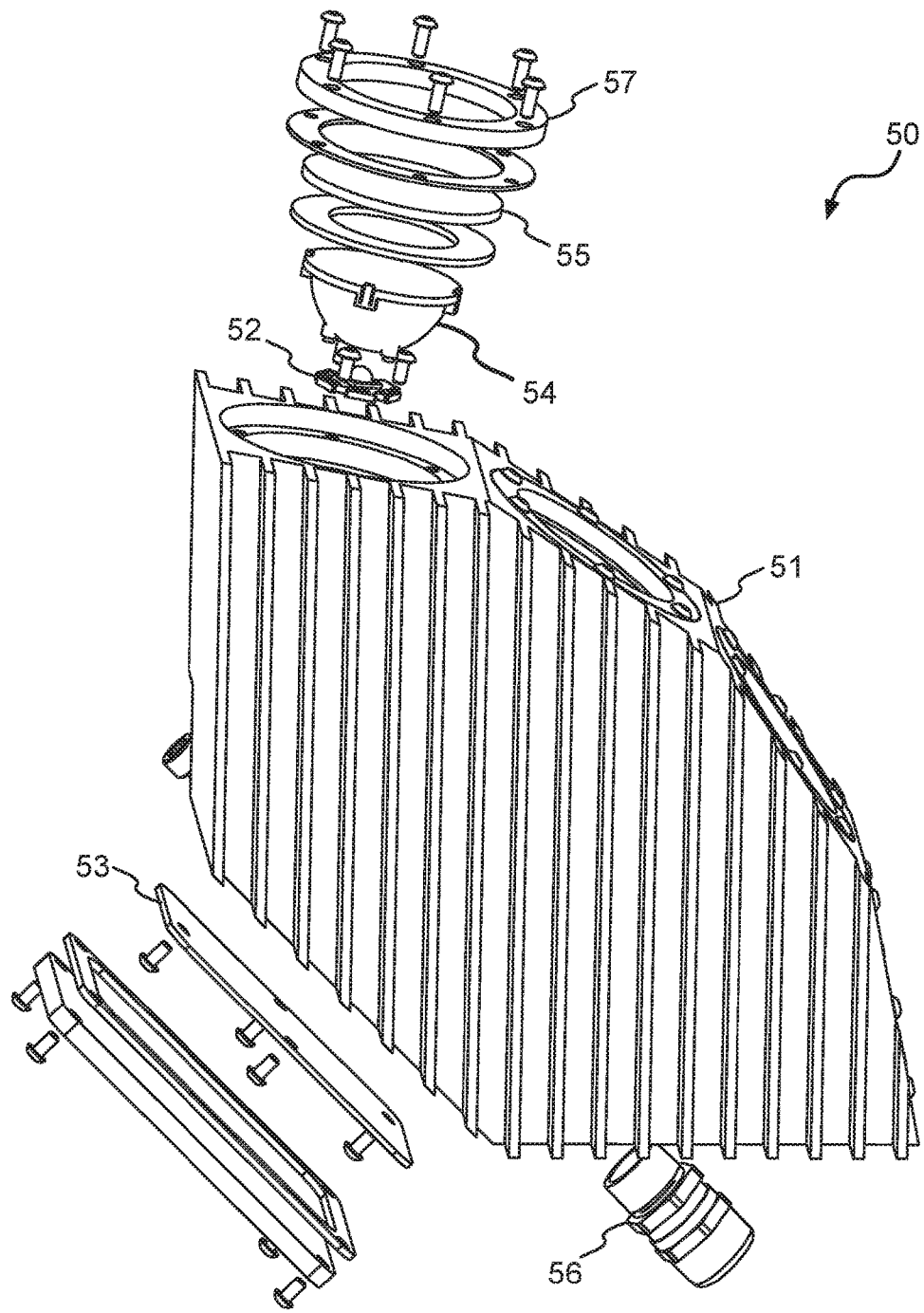
FIGS. 2a and 2b illustrate exploded and cross-sectional views, respectively, of an exemplary embodiment of an ultraviolet illumination source.
Figure 2B:
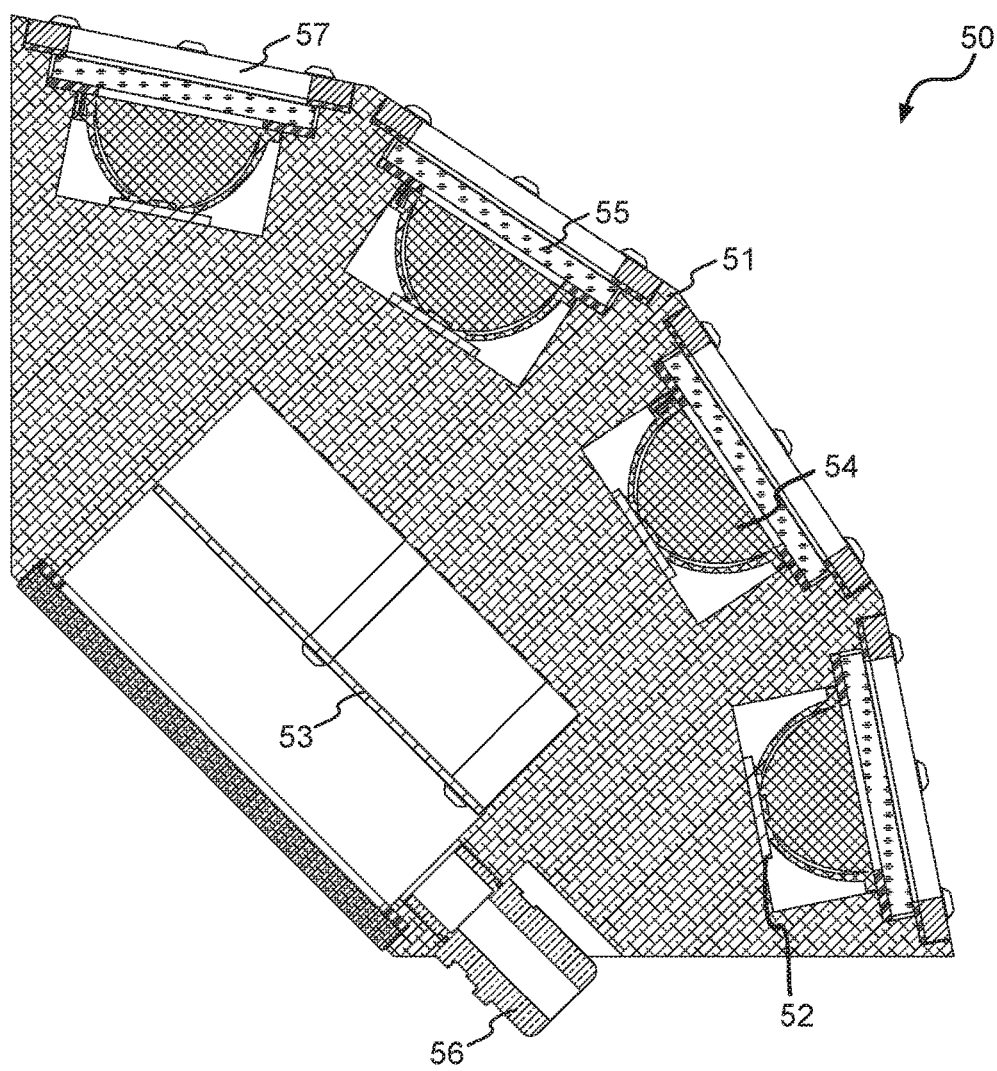

FIGS. 2a and 2b illustrate exploded and cross-sectional views, respectively, of an exemplary embodiment of UV illumination source 50. UV illumination source 50 includes at least one housing 51, a plurality of LEDs 52, an optional pulse modulator 53, a plurality of focusing lenses 54, a plurality of optional dichroic filters 55, a power coupler 56 and a plurality of optional lens protectors 57. UV illumination source 50 operably connects to power source 60 via power coupler 56 to provide power to LEDs 52.

Housing 51 is a heat sink. In the exemplary embodiment, finned projections extending into the exterior atmosphere conduct away heat generated by the operation of LEDs 52. In certain embodiments, housing 51 includes N number of multiple housings 51 to allow for more flexibility in placement of UV illumination source 50. These housings 51 may be distributed on an outer surface of a turbine every A degrees, wherein A is equal to 360/N. By way of non-limiting example, the exemplary embodiment includes four housings 51, distributed every 90 degrees about an outer surface of the turbine. In another embodiment with two housings 51, the housings mount to opposite outer surfaces of the turbine.

LEDs 52 are the source of UV beam 40. Each housing 51 contains multiple light-generating LEDs 52. In certain embodiments, LEDs 52 are monochromatic, emitting light at specific wavelengths. In one embodiment, LEDs 52 emit UV light. In the exemplary embodiment, LEDs 52 are not monochromatic, necessitating the use of dichroic filters 55 to remove non-UV wavelengths from UV beam 40.

In the exemplary embodiment, pulse modulator 53 connects LEDs 52 to power supply 60. This allows pulse modulator 53 to provide power at various intervals, creating a "flashing" or "blinking" effect. In certain embodiments, pulse modulator 53 is configured to provide power to LEDs 52 at random or pseudo-random intervals. In other embodiments, pulse modulator 53 is configured to provide power to LEDs 52 at a frequency of approximately 10 Hz to approximately 0.1 Hz. In other embodiments, pulse modulator 53 is configured to provide power to LEDs 52 at a duty cycle of approximately 10% to approximately 90%. Embodiments of wind turbine system 100 that require steady illumination can eliminate pulse modulator 53.

Focusing lenses 54 mount in housing 51 between LEDs 52 and the exterior atmosphere. In the exemplary embodiment, focusing lenses 54 mount in housing 51 between LEDs 52 and dichroic filters 55. Focusing lenses 54 focus the light output by LEDs 52. In the exemplary embodiment, focusing lenses 54 are collimator lenses that align the light output into a narrower beam than that provided by LEDs 52. This reduces the amount of light that scatters from UV beam 40.

Dichroic filters 55 mount in housing 51 between LEDs 52 and the exterior atmosphere. In the exemplary embodiment, dichroic filters 55 mount in housing 51 between focusing lenses 54 and lens protectors 57. Dichroic filters 55 have a passband below approximately 400 nm, only permitting UV light to escape from housing 51 as UV beam 40. Dichroic filters 55 reflect light above approximately 400 nm back into housing 51, requiring a heat sink to dissipate the excess energy. If LEDs 52 in other embodiments have a sufficiently narrow band of UV emission, dichroic filters 55 are not necessary.

In certain embodiments, lens protectors 57 protect focusing lenses 54 and dichroic filters 55. In the exemplary embodiment, lens protectors 57 are assemblies of transparent acrylic shields held in place by retaining rings.

Power source 60 provides power to LEDs 52. In the exemplary embodiment, power supply 60 receives AC power from the turbine and converts it to DC power of a sufficient voltage to power LEDs 52. Power coupling 56 allows power flow through a wired connection between UV illumination source 50 and power source 60.

It will be understood that many additional changes in the details, materials, procedures and arrangement of parts, which have been herein described and illustrated to explain the nature of the invention, may be made by those skilled in the art within the principle and scope of the invention as expressed in the appended claims.

It should be further understood that the drawings are not necessarily to scale; instead, emphasis has been placed upon illustrating the principles of the invention. Moreover, the terms "substantially" or "approximately" as used herein may be applied to modify any quantitative representation that could permissibly vary without resulting in a change in the basic function to which it is related.

What is claimed is:

1. A selectively perceptible wind turbine system comprising: at least one ultraviolet (UV) illumination source which produces at least one UV beam, wherein said at least one UV beam has a wavelength of approximately 200 to approximately 400 nm; and at least one turbine blade having at least one turbine blade surface, wherein said at least one UV beam extends between said at least one UV illumination source and said at least one turbine blade surface such that said at least one UV beam is in contact with said turbine blade surface to form an illumination interface, wherein the illumination power density from the ultraviolet illumination source does not exceed 100 µW/cm² at any portion of the blade.

2. The system of claim 1, wherein said at least one UV beam has a wavelength of approximately 365 nm.

3. The system of claim 1, wherein said illumination interface has a power density of approximately 1.0 µW/cm2.

4. The system of claim 1, wherein said at least one UV illumination source comprises at least one housing, wherein said housing comprises a heat sink.

5. The system of claim 4, wherein said at least one UV illumination source further comprises a plurality of light-emitting diodes (LEDs) mounted within said at least one housing with a power source coupled to said plurality of LEDs.

6. The system of claim 5, further comprising a pulse modulator mounted within said at least one housing and connecting said power source to said plurality of LEDs.

7. The system of claim 6, wherein said pulse modulator is configured to provide power to said plurality of LEDs at random or pseudo-random intervals.

8. The system of claim 6, wherein said pulse modulator is configured to provide power to said plurality of LEDs at a frequency of approximately 10 Hz to approximately 0.1 Hz.

9. The system of claim 6, wherein said pulse modulator is configured to provide power to said plurality of LEDs at a duty cycle of approximately 10% to approximately 90%.

10. The system of claim 4, wherein said at least one UV illumination source further comprises a plurality of focusing lenses mounted in said at least one housing between said plurality of LEDs and an exterior atmosphere.

11. The system of claim 10, wherein said plurality of focusing lenses are collimator lenses.

12. The system of claim 4, wherein said at least one UV illumination source further comprises a plurality of dichroic filters mounted in said at least one housing between said plurality of LEDs and an exterior atmosphere.

13. The system of claim 12, wherein said plurality of dichroic filters have a passband below approximately 400 nm.

14. The system of claim 4, wherein said at least one housing comprises at least two housings, wherein a first housing is mounted to a first outer surface of a turbine, wherein a second housing is mounted to a second outer surface of a turbine, wherein said first outer surface is located opposite said second outer surface.

15. The system of claim 4, wherein said at least one housing comprises a plurality of housings numbering N, wherein said housings are distributed on an outer surface of a turbine every A degrees, wherein A is equal to 360/N.

16. The system of claim 1, wherein said at least one UV illumination source comprises a plurality of UV illumination sources, wherein at least one of said plurality of UV illumination sources produces at least one UV beam directed to a first section of said selectively perceptible wind turbine system, wherein at least another of said plurality of UV illumination sources produces at least another UV beam directed to a second section of said selectively perceptible wind turbine system, wherein said first section and said second section have different locations.

17. The system of claim 1, further comprising at least one additional UV beam extending between at least one additional UV illumination source and a turbine monopole surface, said at least one additional UV beam having a wavelength of approximately 200 to approximately 400 nm, wherein said at least one additional UV beam is in contact with said turbine monopole surface to form a monopole illumination interface with a power density of less than 100 uW/cm2.

18. The system of claim 1, further comprising at least one additional UV beam extending between at least one additional UV illumination source and a turbine nacelle surface, said at least one additional UV beam having a wavelength of approximately 200 to approximately 400 nm, wherein said at least one additional UV beam is in contact with said turbine nacelle surface to form a nacelle Illumination interface with a power density of less than 100 μW/cm2.

19. The system of claim 1, further comprising a rear surface of said turbine blade surface faces a turbine nacelle surface, and said illumination interface is only on the rear surface of the turbine blade.

20. A method of reducing deaths of flying bats by forming a selectively perceptible wind turbine system comprising steps of: forming at least one ultraviolet (UV) illumination source which produces at least one UV beam, wherein said at least one UV beam has a wavelength of approximately 200 to approximately 400 nm; and disposing at least one wind turbine having at least one turbine blade, nacelle, or monopole 9 surface, wherein said at least one UV beam extends between said at least one UV illumination source and said at least one turbine blade, nacelle, or monopole surface such that said at least one UV beam is in contact with said turbine blade, nacelle, or monopole surface to form an illumination interface, wherein the illumination power density from the UV illumination source does not exceed 100 100 μW/cm² at any point on the blade, nacelle, or monopole surface.

* * * * *